F. E. FISHER.

ENGINE STARTER.

APPLICATION FILED APR. 2, 1917.

Reissued Sept. 5, 1922.

15,444.

2 SHEETS—SHEET 1.

Inventor

Frank E. Fisher

By P. C. Thomas

Attorney

Witness

P. C. Thomas

Wayne S. Thomas

F. E. FISHER.

ENGINE STARTER.

APPLICATION FILED APR. 2, 1917.

Reissued Sept. 5, 1922.

15,444.

2 SHEETS—SHEET 2.

Inventor

Frank E. Fisher

Witness

P. C. Thomas.

Wayne S. Thomas.

By F. B. Thomas

Attorney

Reissued Sept. 5, 1922. Re. 15,444

UNITED STATES PATENT OFFICE.

FRANK E. FISHER, OF DETROIT, MICHIGAN.

ENGINE STARTER.

Original No. 1 113,156, dated October 6, 1914, Serial No. 749,783, filed February 21, 1913. Application for reissue filed April 2, 1917. Serial No. 159,336.

*To all whom it may concern:*

Be it known that I, FRANK E. FISHER, citizen of the United States, residing at Detroit, county of Wayne, State of Michigan, have invented a certain new and useful Improvement in Engine Starters, and declare the following to be a full, clear, and exact description of the same, such as will enable others skilled in the art to which it pertains to make and use the same, reference being had to the accompanying drawings, which form a part of this specification.

My invention relates to an improvement in a combined starting and lighting apparatus for automobiles employing an internal combustion engine as the motive power for the vehicle.

Among other objects of the invention is the combination in a single relatively small unit of a motor for "starting" the engine and a generator to furnish current for lighting the car, to recharge a storage battery to operate the motor, and for ignition purposes if desired.

The armature shaft of the motor is connected through a train of gears and an automatic engaging and releasing clutch with the armature shaft of the generator, in turn permanently connected by suitable sprocket or other gearing with the crank shaft of an engine; the armature shaft of the generator when driven by the motor, serving only to actuate the gearing carried by and connecting it with the crank shaft of the engine to start the latter. Coincident with the operation of the engine under its own power, the driving connection between the armature shaft of the motor and the armature shaft of the generator is severed through the automatic operation of a clutch mechanism before referred to, and hereafter more fully explained,—while the generator when driven by the engine, furnishes current to recharge the battery to operate the motor and for lighting or ignition purposes as required.

Other features of the invention will be hereafter explained.

Figure 1:
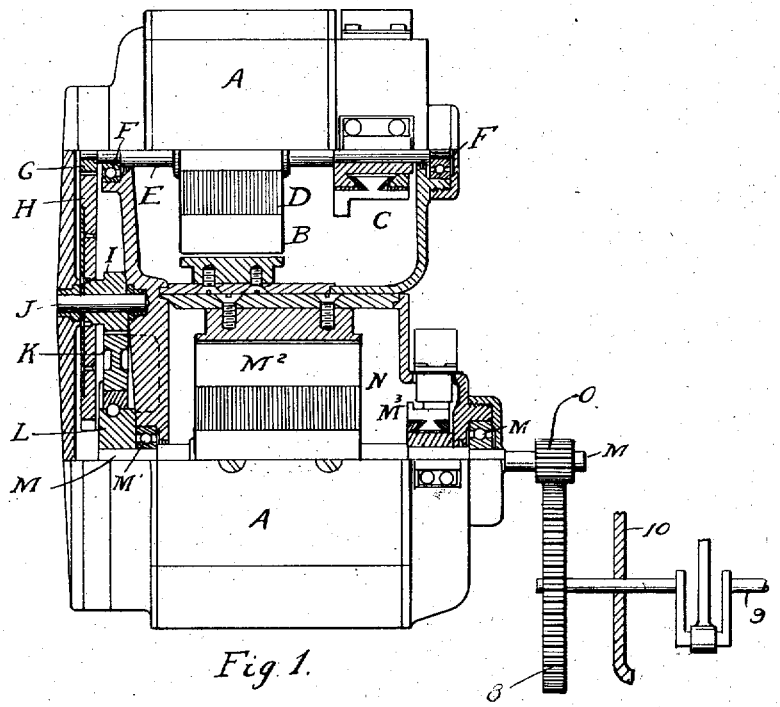
Figure 7:
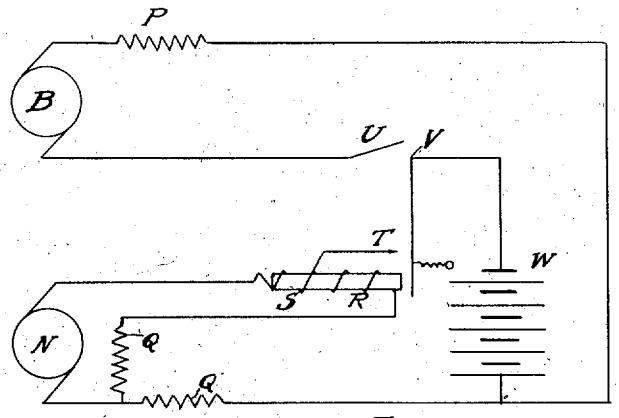
Figure 3:
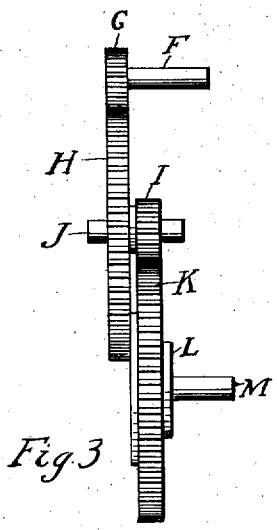
Figure 2:
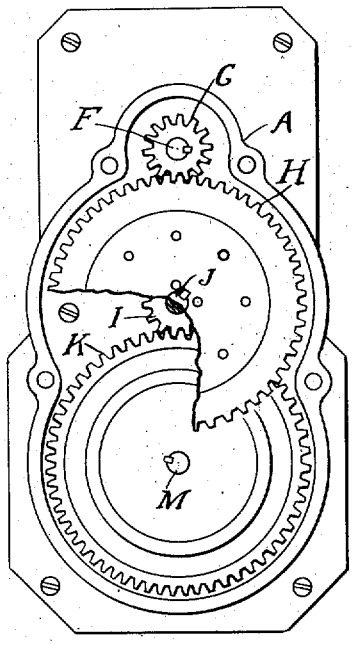
Figure 4:
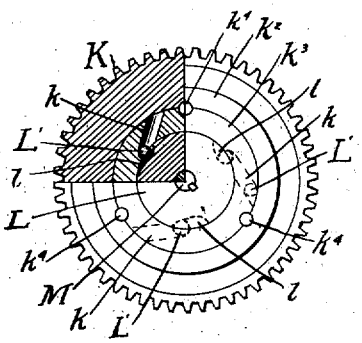
Figure 5:
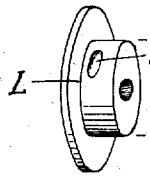
Figure 6:
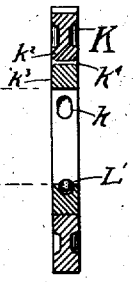

In the drawings accompanying this specification:—Figure 1 is a side elevation partly in section, of the combined starting motor and lighting generator outfit. Fig. 2 is an end elevation of the same with the end of the case removed and parts broken away, to disclose the driving gear connection between the armature shaft of the motor and the armature shaft of the generator. Fig. 3 is a detail view in side elevation of the train of gears shown in Fig. 2. Fig. 4 is a face view partly in section, of the clutch gear and hub carried by the armature shaft of the lighting generator. Fig. 5 is a perspective view of the hub keyed to the shaft of the generator. Fig. 6 is a cross-sectional view through the gear shown in Fig. 4. Fig. 7 is a diagrammatic view of the wiring system.

Referring now to the letters of reference placed upon the drawings: A indicates an inclosing frame suitably supported in the chassis of an automobile (not shown), housing a starting motor B and lighting and recharging generator N.

C is the commutator of the motor; D its armature; and E the armature shaft journaled in ball-bearings F, F, carried by the frame, on the end of which is secured a pinion G. The pinion G meshes with a gear H—which may be constructed of fiber as indicated to reduce the noise incident to its operation—the gear being in turn secured to or made integral with a pinion I, mounted on the stub shaft J journaled in the frame. The pinion I meshes with a gear K floating on a hub L, keyed to the shaft M, of the lighting generator N M′, M′, are ball bearings for the shaft supported in the frame.

$M^2$ denotes the armature of the lighting generator and $M^3$ its commutator.

L′, L′, L′, is a ball clutch lodged in channels *k*, *k*, *k*, in the gear K and the co-acting grooves, *l*, *l*, *l*, of the hub L. For convenience in drilling the channels in the gear K, the gear is formed of two concentric rings $k^2$, $k^3$, keyed together as at $k^4$ to form a single unit.

O is a sprocket or other gear mounted on the end of the generator shaft M permanently in gear with the pinion 8 keyed to the crank shaft 9 of an internal combustion engine a portion of the casing of which is shown at 10 and therefore in operation whenever the engine is running.

Referring now to the diagrammatic view, indicating the electrical circuit, shown in Fig. 7, B is the motor, and N the generator. P is the series windings of the motor, Q is the shunt windings of the generator and Q′ the series windings of the generator;—the series being connected in differential to the shunt. R is the winding on a relay connected in series with the shunt,—which closes when the generator has reached say six volts, at point T. S is the differential windings on relay and tends to demagnetize the core of the relay releasing the armature at T when the voltage falls below six volts.

Having indicated the several parts by reference letters, the construction and operation of the apparatus will be readily understood. To start the engine the circuit between the storage battery W and the motor B is closed by forcing down a suitable spring actuated switch lever U forming a contact at V, whereupon the armature of the motor immediately begins to rotate actuating the pinion G meshing with the gear H,—integral with or secured to the pinion I. The pinion I in turn drives the gear K which being automatically locked to the shaft M of the generator N through the ball clutch L′, drives the gear O on the end of the generator shaft thereby putting in motion the engine crank shaft permanently geared thereto and thus starting the engine. It will now be obvious that when the crank shaft of the engine operating under its own power, exceeds the speed of the generator shaft driven by the motor, the driving connection between the motor shaft and the generator shaft will be released through the automatic operation of the ball clutch L′. When the engine begins to operate under its own power, the circuit between the battery and motor is broken by the operator releasing pressure on the spring actuated lever U thereby cutting off the supply of current to the motor and suspending its further operation until it is again desired to start the engine. When the generator has reached an R. P. M. of about 250, the lever of the relay is closed at T whereupon the generator begins to charge the storage battery supplying current to operate the motor, and for lighting or ignition purposes. It is to be noted that when the motor B is operated by the closing of the switch U, the battery W is cut into the circuit of said motor. When the engine operates to drive the generator N current flows through the relay coil and energizes the relay magnet, thus closing the circuit through the contact T. Prior to the closing of this circuit, current will flow only through the shunt winding of the generator but after this circuit is closed current will flow both through the shunt winding of the generator and through the series winding thereof. Thus the relay acts to not only cut in the series winding but also to cut in the battery as above noted.

As will be seen, the motor and generator are so positioned relative to each other and to a plane which extends perpendicular to the axis of the generator armature shaft that another plane parallel to such first plane will intersect the axes of both motor and generator within the approximate limits of the armatures thereof; the limits may include the commutator portion, as will be understood by locating the second plane as extending through the generator armature adjacent its right end in Fig. 1, such plane extending through commutator C of the motor.

Having thus described my invention, what I claim is:—

1. In an appliance of the character described, in combination with the crank shaft of an internal combustion engine; an electric generator, an armature shaft for said generator, means mounted upon said armature shaft adapted for permanent driving connection with the crank shaft of the internal combustion engine, a motor, a train of gears driven by the motor adapted to actuate the armature shaft of the generator, a clutch mechanism designed to establish a driving relation between the motor and the armature shaft of the generator to start the engine and to disconnect said driving relation upon the engine operating under its own power, said motor and generator being positioned relative to a plane extending perpendicular to the axis of the generator armature shaft in such manner that a single plane parallel to said first-named plane will intersect the axes of both motor and generator within the approximate limits of the armatures thereof.

2. In an appliance of the character described, in combination with the crank shaft of an internal combustion engine; a single unit comprising an electric generator, an armature shaft for said generator, a gear carried by said armature shaft and adapted for permanent driving connection with the crank shaft of the internal combustion engine, a motor, an armature shaft for said motor, the armature shafts of the motor and generator extending in substantial parallelism, a train of gears driven by the motor adapted to actuate the armature shaft of the generator, an automatic engaging and releasing clutch mechanism to connect the armature shaft of the motor through the train of gears with the armature shaft of the generator to start the engine upon the operation of the motor and adapted to release said driving connection upon the operation of the armature shaft of the generator by the engine operating under its own power, said motor and generator being positioned relative to a plane extending perpendicular to the axis of the generator armature shaft in such manner that a single plane parallel to said first-named plane will intersect the axes of both motor and generator within the approximate limits of the armatures thereof.

3. In an appliance of the character described, in combination with the crank shaft of an internal combustion engine; an electric generator, an armature shaft for said generator, means mounted upon said armature shaft and adapted for permanent driving connection with the crank shaft of the internal combustion engine, an electric motor, an armature shaft for said motor, the armature shafts of the motor and generator extending in substantial parallelism, a train of gears connecting the armature shaft of the motor with the armature shaft of the generator, and an automatic engaging and releasing clutch mechanism cooperating therewith, whereby the motor may rotate the armature shaft of the generator and through it the crank shaft to start the engine, the driving connection between the motor shaft and the armature shaft of the generator being disconnected automatically through the action of the clutch mechanism upon the engine operating under its own power and remaining disconnected until the motor is again operated to start the engine, said motor and generator being positioned relative to a plane extending perpendicular to the axis of the generator armature shaft in such manner that a single plane parallel to said first-named plane will intersect the axes of both motor and generator within the approximate limits of the armatures thereof.

4. In an appliance of the character described, the combination with a crank shaft of an internal combustion engine, an electric generator, an armature shaft for said generator, a gear upon said armature shaft adapted for permanent driving connection with the crank shaft of the internal combustion engine, an electric motor, an armature shaft for said motor, the armature shafts of the motor and generator extending in substantial parallelism, a train of gears driven by the motor adapted to actuate the armature shaft of the generator to rotate the crank shaft of the engine whereby the latter is started, a ball clutch mechanism designed to lock the armature shaft of the generator in driven relation with the train of gears and to release said generator shaft from its driven relation with the gears upon the generator being driven by the crank shaft of the internal combustion engine operating under its own power, said motor and generator being positioned relative to a plane extending perpendicular to the axis of the generator armature shaft in such manner that a single plane parallel to said first-named plane will intersect the axes of both motor and generator within the approximate limits of the armatures thereof.

5. In an appliance of the character described, in combination with the crank shaft of an internal combustion engine; a single inclosed unit comprising a case, an electric generator housed within the case, an armature shaft for said generator, a gear upon said armature shaft and adapted for permanent driving connection with the crank shaft of the internal combustion engine, an electric motor directly above the generator within the case, an armature shaft for said motor, a train of gears driven by the motor adapted to rotate the armature shaft of the motor to start the engine, an automatically engaging and releasing ball clutch mechanism adapted to establish a driving connection between the motor and generator shaft when said shaft is actuated by the motor, and to cut off the motor connection with the generator shaft when the generator shaft is driven by the engine.

6. In starting and lighting apparatus for a motor vehicle and in combination with the engine thereof, a starting motor and a lighting generator in the form of a unitary structure or self-contained unit having a single supporting frame by which said unit is adapted to be secured in fixed relation to the engine, said unit having its motor and generator armature shafts extending in substantially parallelism, and power transmitting mechanism for both the motor and generator having a single driving connection with the crank shaft of the engine, said motor and generator being positioned relative to a plane extending perpendicular to the axis of the generator armature shaft in such manner that a single plane parallel to said first-named plane will intersect the axes of both motor and generator within the approximate limits of the armatures thereof.

7. In combination with the engine of a motor vehicle, engine starting and lighting mechanism for the vehicle and including a starting motor, a lighting generator and power transmitting means for both the motor and generator, said power transmitting means having a single driving connection with the crank shaft of the engine, and said motor, generator and power transmitting means being in the form of a unitary structure having a common support and adapted to be applied as a unit to the vehicle and to be supported thereby in definite relationship with respect to the engine, the motor and generator armature shafts extending in substantial parallelism, said motor and generator being positioned relative to a plane extending perpendicular to the axis of the generator armature shaft in such manner that a single plane parallel to said first-named plane will intersect the axes of both motor and generator within the approximate limits of the armatures thereof.

8. In starting and lighting apparatus for motor vehicles and in combination with the internal combustion engine thereof, a motor, a generator, and power transmitting mechanism connecting the engine crank shaft to both the motor and the generator, said power transmitting mechanism including a shaft which is common to both the motor and generator, the armature shafts of the motor and generator being located out of axial alinement, and a common support for the shaft, motor and generator, by which said unit is supported on the vehicle in fixed relationship with respect to the engine, said support including a casing structure operative to house the drive connections between the motor and generator.

9. In combination with an internal combustion engine, an electric starting and lighting apparatus including a motor, a generator, power transmitting mechanism between the engine and motor and generator respectively, comprising a shaft connected to the engine and to the generator, and connecting means between the shaft and the motor including speed reduction gearing and clutching mechanism by which driving relationship is established between the motor and shaft only when the shaft is driven by the motor, an enclosing casing for the said gearing and clutching mechanism, said motor, generator and power transmitting mechanism being in the form of a unitary structure adapted to be applied to and supported as a unit in fixed relationship with respect to the engine.

10. An electric starting and current generating apparatus for use with internal combustion engines comprising an enclosing frame adapted to be suitably supported in the chassis of an automobile, a shaft rotatably mounted in said frame, a motor and a generator both connected to said frame, said shaft being in alinement with and having a direct connection with the rotary element of the generator, and speed reduction gearing, and a ratchet driving mechanism between said shaft and the rotary element of the motor, said gearing and ratchet driving mechanism being incased in said frame.

In testimony whereof, I hereunto affix my signature in the presence of two witnesses.

FRANK E. FISHER.

Witnesses:
L. E. Thomas,
N. H. House.